(12) United States Patent
Tsuchihashi

(10) Patent No.: US 10,051,144 B1
(45) Date of Patent: Aug. 14, 2018

(54) POST-PROCESSING APPARATUS, CONTROL METHOD, AND IMAGE FORMING SYSTEM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Tsuchihashi, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/466,034

(22) Filed: Mar. 22, 2017

(30) Foreign Application Priority Data

Feb. 2, 2017 (JP) ................................ 2017-017867

(51) Int. Cl.
| | | |
|---|---|---|
| G03G 15/00 | (2006.01) | |
| H04N 1/32 | (2006.01) | |
| G06K 15/00 | (2006.01) | |

(52) U.S. Cl.
CPC ..... *H04N 1/32138* (2013.01); *G03G 15/5062* (2013.01); *G03G 15/6541* (2013.01); *G06K 15/404* (2013.01); *G06K 15/408* (2013.01); *H04N 1/3263* (2013.01); *G03G 2215/00426* (2013.01); *G03G 2215/00818* (2013.01); *G03G 2215/00822* (2013.01); *H04N 2201/0094* (2013.01)

(58) Field of Classification Search
CPC ....... G03G 21/046; G03G 2215/00932; G03G 15/0863; G03G 15/0855; G03G 15/0865; G03G 15/0872; G03G 15/5075; G03G 15/55; G03G 15/553; G03G 15/5062; G03G 15/607; G03G 15/655; G03G 21/00; G03G 21/18
USPC .... 358/1.15, 1.13, 1.16, 1.14, 402, 435, 1.9, 358/3.24, 3.28, 400, 405, 406, 437, 504, 358/1.1, 1.18, 296, 401, 403, 438, 444; 399/366, 80, 12, 24, 391, 405, 61, 8; 271/3.13; 345/30; 347/106, 19, 6, 86; 348/E5.024, 155, 207.1, 231.2, 231.99, 348/553; 379/100.05, 100.06; 380/55
See application file for complete search history.

(56) References Cited

U.S. PATENT DOCUMENTS

| | | | |
|---|---|---|---|
| 7,466,957 B2 | 12/2008 | Muto | |
| 9,604,488 B2 * | 3/2017 | Sakata | ...................... B31F 1/08 |
| 2005/0141003 A1 * | 6/2005 | Yamamoto | ......... G06K 7/10336 358/1.12 |
| 2006/0215228 A1 * | 9/2006 | Inaba | ................... H04N 1/0084 358/3.28 |
| 2007/0003340 A1 * | 1/2007 | Yoshino | ............... G03G 21/046 399/366 |
| 2007/0274753 A1 * | 11/2007 | Muto | ..................... B41J 11/008 400/62 |

(Continued)

*Primary Examiner* — Negussie Worku
(74) *Attorney, Agent, or Firm* — Amin, Turocy & Watson LLP

(57) ABSTRACT

A post-processing apparatus of an embodiment discharges a sheet determined that writing of information to a wireless tag provided in the sheet is successful to a first paper discharge portion, and discharges a sheet determined that writing of information to a wireless tag provided in the sheet fails to a second paper discharge portion different from the first paper discharge portion.

17 Claims, 8 Drawing Sheets

(56) References Cited

U.S. PATENT DOCUMENTS

| | | | |
|---|---|---|---|
| 2010/0073737 A1* | 3/2010 | Honda | H04N 1/0473 358/474 |
| 2010/0091323 A1* | 4/2010 | Sunada | B41J 13/106 358/1.15 |
| 2010/0214592 A1 | 8/2010 | Muroi | |
| 2010/0290068 A1* | 11/2010 | Okada | G03G 15/50 358/1.9 |
| 2011/0051165 A1* | 3/2011 | Yamada | G06F 3/1203 358/1.13 |
| 2016/0290071 A1* | 10/2016 | Holman | B63B 39/03 |
| 2017/0213313 A1* | 7/2017 | Hakura | G06T 1/20 |

\* cited by examiner

POST-PROCESSING APPARATUS, CONTROL METHOD, AND IMAGE FORMING SYSTEM

CROSS-REFERENCE TO RELATED APPLICATIONS

This application is based upon and claims the benefit of priority from Japanese Patent Application No. 2017-017867, filed Feb. 2, 2017, the entire contents of which are incorporated herein by reference.

FIELD

Embodiments described herein relate generally to a post-processing apparatus, a control method, and an image forming system.

BACKGROUND

There is a sheet on which a wireless tag (radio frequency (RF) tag) is provided. There is an apparatus which forms an image by an electrophotographic method on the sheet, writes information to the wireless tag, and reads the information.

In the electrophotographic method, since heat and pressure are applied in a fixing portion or the like for fixing a toner image, there is a case where the wireless tag fails. In this case, the writing of information to the wireless tag fails. In addition, even when the wireless tag does not fail, there is also a case where the writing of information to the wireless tag fails.

In a case where the writing of information to the wireless tag fails, confusion is caused because a sheet to which the writing of information is successful and a sheet to which the writing of information fails exist together at the discharge destination of the sheet.

DETAILED DESCRIPTION

A post-processing apparatus of an embodiment includes a receiving portion, a determination portion, and a paper discharge control portion. The receiving portion receives a sheet output by an image forming apparatus which writes information to a wireless tag provided in the sheet. The determination portion determines the success or failure of writing of information to the wireless tag provided in the sheet received by the receiving portion. The paper discharge control portion discharges the sheet which is determined that the writing of information is successful by the determination portion to a first paper discharge portion, and discharges the sheet which is determined that the writing of information fails by the determination portion to a second paper discharge portion different from the first paper discharge portion.

Figure 1:
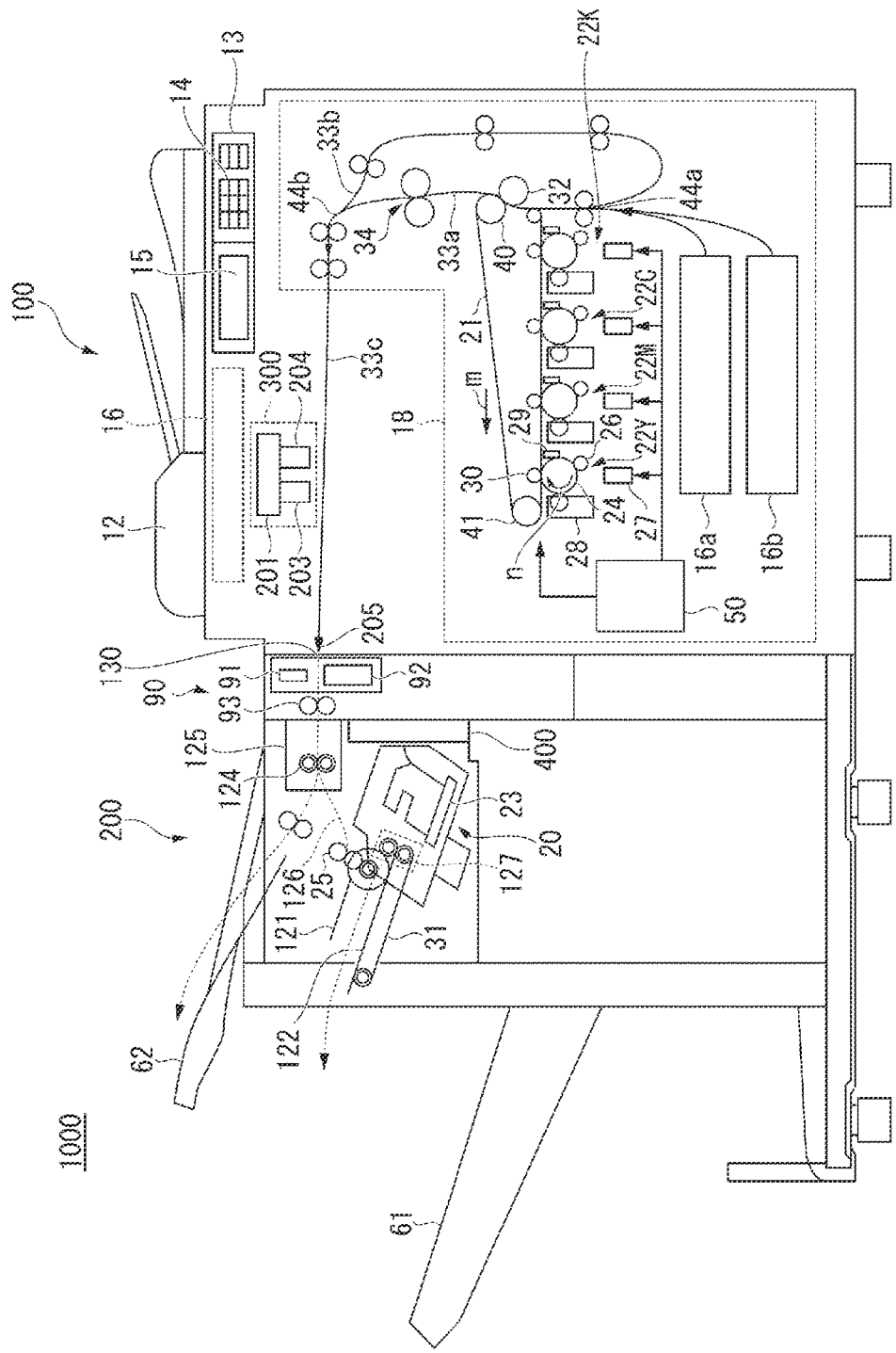
FIG. 1 is a view illustrating a schematic configuration of an image forming system of an embodiment.

FIG. 1 is a schematic configuration view of an example of an image forming system 1000 of the embodiment. The image forming system 1000 is configured of an image forming apparatus 100 and a post-processing apparatus 200.

The image forming apparatus 100 is a multi-function peripherals (MFP) which is a compound machine, a printer, or a copier. The post-processing apparatus 200 is disposed to be adjacent to the image forming apparatus 100.

A sheet on which an image is formed by the image forming apparatus 100 is transported to the post-processing apparatus 200. The post-processing apparatus 200 receives the sheet supplied from the image forming apparatus 100. The post-processing apparatus 200 is provided with a paper discharge tray 61 and a fixing tray 62. The paper discharge tray 61 can be raised and lowered. The post-processing apparatus 200 discharges the received sheet to the paper discharge tray 61 or the fixing tray 62. The paper discharge tray 61 is an example of the first paper discharge portion. The fixing tray 62 is an example of the second paper discharge portion.

In FIG. 1, an original document table (not illustrated) is in an upper portion of the image forming apparatus 100, and an auto document feeder (ADF) 12 is provided to be freely opened and closed on the original document table. Furthermore, a control panel 13 is provided in the upper portion of the image forming apparatus 100. The control panel 13 is provided with an operation portion 14 including various keys, and a touch panel type display portion 15.

The image forming apparatus 100 is provided with a scanner portion 16. The scanner portion 16 reads an original document fed by the ADF 12, or an original document put on the original document table.

The image forming apparatus 100 is provided with a wireless tag unit 300 and a printer portion 18. The printer portion 18 is provided with an image forming control portion 50 and paper supply cassettes 16a and 16b. The image forming control portion 50 controls the control panel 13, the wireless tag unit 300, and the printer portion 18. The image forming control portion 50 controls the transport of the sheet in the printer portion 18. A wireless tag in the embodiment is, for example, a radio frequency (RF) tag.

The paper supply cassette 16a accommodates a sheet having the wireless tag (hereinafter, referred to as "wireless tag sheet") therein. The paper supply cassette 16b accommodates a normal sheet which does not have the wireless tag (hereinafter, referred to as "normal sheet").

The printer portion 18 forms an image. For example, the printer portion 18 forms an image which is shown by image data. In the following description, forming the image is also expressed as printing. The printer portion 18 is provided with an intermediate transfer belt 21. The printer portion 18 supports the intermediate transfer belt 21 by a driven roller 41 and a backup roller 40. The printer portion 18 rotates the intermediate transfer belt 21 in an arrow m direction.

The printer portion 18 is provided with four groups of image forming stations 22Y, 22M, 22C, and 22K. Each of the image forming stations 22Y, 22M, 22C, and 22K is for forming images of each color of Y (yellow), M (magenta), C (cyan), and K (black). The image forming stations 22Y, 22M, 22C, and 22K are disposed to be aligned along a rotational direction of the intermediate transfer belt 21 on a lower side of the intermediate transfer belt 21.

Hereinafter, among each of the image forming stations 22Y, 22M, 22C, and 22K, the image forming station 22Y of Y (yellow) will be described as an example. In addition, since the image forming stations 22M, 22C, and 22K are configured similar to the image forming station 22Y, the description thereof will be omitted.

The image forming station 22Y is provided with an electrostatic charger 26, an exposure scanning head 27, a developing device 28, and a photoconductive cleaner 29. The electrostatic charger 26, the exposure scanning head 27, the developing device 28, and the photoconductive cleaner 29 are disposed around a photoconductive drum 24 that rotates in an arrow n direction.

The image forming station 22Y is provided with a primary transfer roller 30. The primary transfer roller 30 opposes the photoconductive drum 24 via the intermediate transfer belt 21.

The image forming station 22Y is exposed by the exposure scanning head 27 after electrostatically charging the photoconductive drum 24 by the electrostatic charger 26. The image forming station 22Y forms an electrostatic latent image on the photoconductive drum 24. The developing device 28 develops the electrostatic latent image on the photoconductive drum 24 by using a two-component developer formed of toner and carrier.

The primary transfer roller 30 primarily transfers a toner image formed in the photoconductive drum 24 to the intermediate transfer belt 21. The image forming stations 22Y, 22M, 22C, and 22K form a color toner image on the intermediate transfer belt 21 by the primary transfer roller 30. The color toner image is formed by toner images of Y (yellow), M (magenta), C (cyan), and K (black) overlapped in order. The photoconductive cleaner 29 removes the toner that remains in the photoconductive drum 24 after the primary transfer.

The printer portion 18 is provided with a secondary transfer roller 32. The secondary transfer roller 32 opposes the backup roller 40 via the intermediate transfer belt 21. The secondary transfer roller 32 secondarily transfers the color toner images on the intermediate transfer belt 21 to the sheet at a time.

A transport path 33a is a transport path from a merging portion 44a to a branch portion 44b. A transport path 33b is a transport path for performing duplex printing, and is a transport path from the branch portion 44b to the merging portion 44a. A transport path 33c is a transport path to a paper discharge portion 205 via the wireless tag unit 300 from the branch portion 44b.

The image forming control portion 50 transports the sheet taken out from the paper supply cassettes 16a and 16b toward the transport path 33a, and forms an image on the sheet by fixing the toner image by a fixing device 34. The image forming control portion 50 discharges the sheet by transporting the sheet on which the image is formed to the transport path 33c.

The wireless tag unit 300 is provided with a wireless tag unit control portion 201, a switching portion 202, a reading portion 203, and a writing portion 204. In the embodiment, the wireless tag unit 300 is attachable to and detachable from the printer portion 18.

The wireless tag unit control portion 201 is provided with an arithmetic unit and a storage device. The wireless tag unit control portion 201 controls the reading portion 203 and the writing portion 204. In addition, the wireless tag unit control portion 201 can communicate with the image forming control portion 50. The wireless tag unit control portion 201 can detect that the sheet is transported to the wireless tag unit 300.

The writing portion 204 writes information (hereinafter, also referred to as "tag data") to the wireless tag of the wireless tag sheet on which the image is formed. The reading portion 203 reads the information from the wireless tag. The wireless tag unit control portion 201 determines whether or not the writing of information by the writing portion 204 is successful by the information read from the wireless tag by the reading portion 203. The determination result indicating whether or not the writing of the information by the writing portion 204 is successful is sent to the post-processing apparatus 200 via the image forming control portion 50. Regardless whether or not the writing by the wireless tag unit 300 is successful, the sheet is transported to a receiving portion 130 of the post-processing apparatus 200 from the paper discharge portion 205. In the receiving portion 130, a sensor is provided, and the sensor can detect that the sheet is transported.

A developing method of the above-described image forming apparatus 100 is a tandem developing method, but is not limited thereto, and the number of developing devices 28 is also not limited.

Next, the post-processing apparatus 200 will be described. The post-processing apparatus 200 is provided with a stapling mechanism 20, a punching mechanism 90, and a post-processing control portion 400. In addition, a saddle unit which performs processing of saddle stitching and bifolding of the sheet may be provided.

The post-processing control portion 400 generally controls the post-processing apparatus 200, such as control of the stapling mechanism 20 and the punching mechanism 90, or transport control of the sheet.

The punching mechanism 90 is disposed on the downstream side of the receiving portion 130. The punching mechanism 90 is provided with a punching mechanism 91 and a dust box 92. When the user operates the control panel 13 and sets a punch mode, the punching is executed by the punching mechanism 91. The sheet discharged from the punching mechanism 90 is transported to a paper discharge switching portion 125 by a sheet transporting roller 93. The paper discharge switching portion 125 is provided with an inlet roller 124, discharges the sheet to the fixing tray 62, or transports the sheet to a paper supply roller 25. Binding processing is performed with respect to the sheet transported to the paper supply roller 25 by the stapling mechanism 20. In the following description, there is a case where the control of discharging the sheet to the fixing tray 62 is referred to as a first control. In addition, the control of transporting the sheet to the paper supply roller 25 is referred to as a second control.

The post-processing apparatus 200 is provided with a standby tray 121 and a processing tray 122. The paper supply roller 25 is provided on the downstream side of the inlet roller 124. The sheet received by the inlet roller 124 is transported to the standby tray 121 via the paper supply roller 25. The paper supply roller 25 is configured of an upper roller and a lower roller. A paper path 126 for guiding the sheet to the paper supply roller 25 is provided between the inlet roller 124 and the standby tray 121. The processing tray 122 on which the sheets that fall from the standby tray 121 are stacked is disposed below the standby tray 121.

The standby tray 121 can stack a plurality of sheets. In addition, the standby tray 121 has an openable structure, and the standby tray 121 opens when a predetermined number of sheets are stacked. The sheet falls to the processing tray 122 by an operation of a falling auxiliary member which is not illustrated and which automatically or forcibly allows the sheet to fall. The processing tray 122 adjusts and supports sheets P while the sheets are stapled by a stapler 23.

The sheet which falls to the processing tray 122 is guided to the stapler 23 by a roller 127, and the binding processing is performed. The roller 127 is configured of an upper roller and a lower roller. In a case of stapling the sheets, the plurality of sheets P which fall to the processing tray 122 from the standby tray 121 are adjusted in the longitudinal direction which is the transport direction, and are stapled after being adjusted in the lateral direction orthogonal to the transport direction. A transport belt 31 is driven to be rotated, and cyclically moves to rotate between the stapler 23 and a discharge port along the discharge direction of the sheet.

Figure 2:
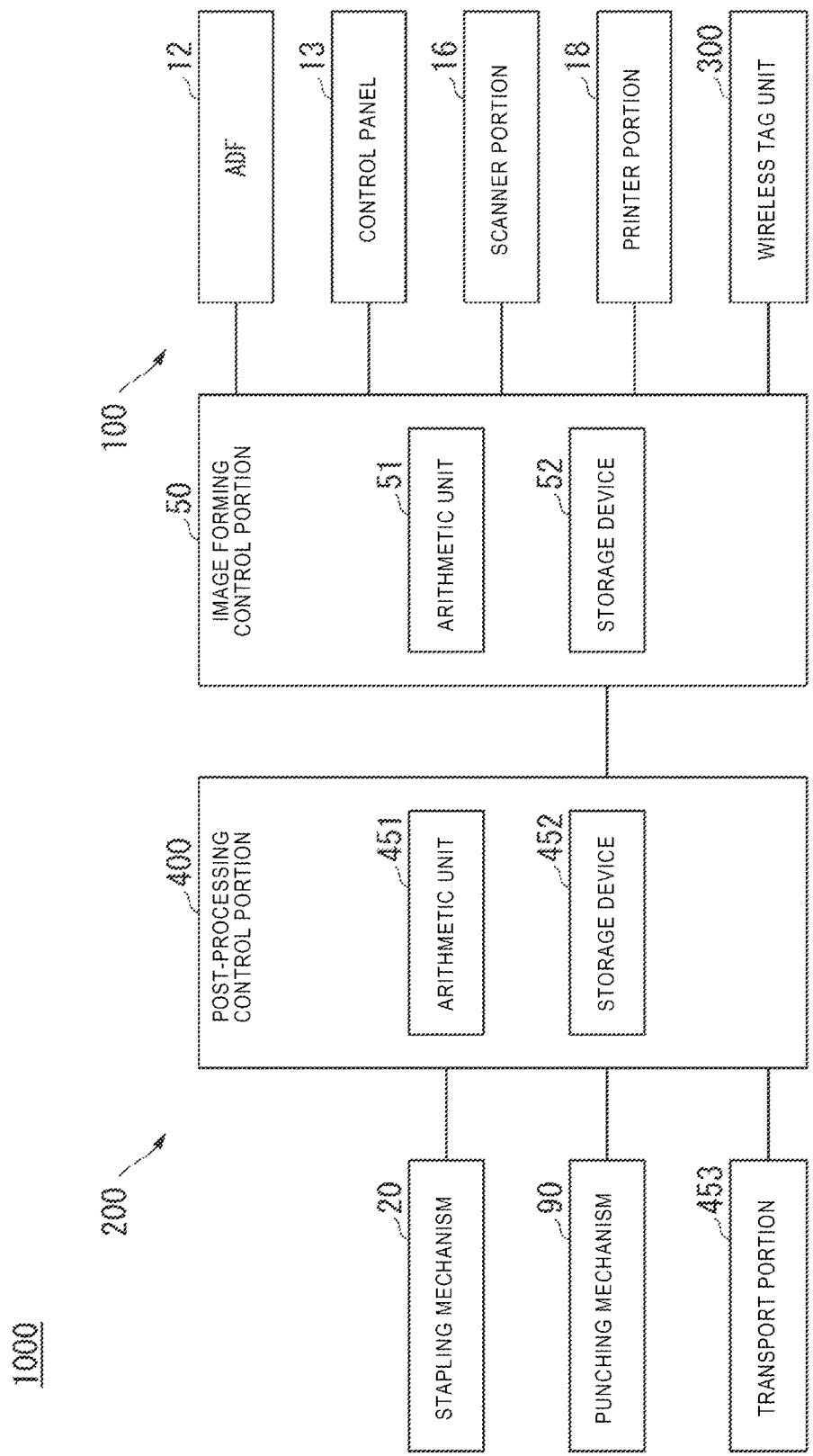
FIG. 2 is a view illustrating a control system of an image forming apparatus and a post-processing apparatus.

FIG. 2 is a view illustrating a control system of the image forming apparatus 100 and the post-processing apparatus 200.

In FIG. 2, the image forming control portion 50 is provided with an arithmetic unit 51 and a storage device 52. The arithmetic unit 51 controls the ADF 12, the control panel 13, the scanner portion 16, the printer portion 18, and the wireless tag unit 300 according to various programs stored in the storage device 52.

The arithmetic unit 51 is, for example, a central processing unit (CPU), an application specific integrated circuit (ASIC), or the like. The storage device 52 is a read only memory (ROM), a random access memory (RAM), or the like.

The image forming control portion 50 is connected to the post-processing control portion 400 by a bus. The determination result indicating whether or not the writing of information by the writing portion 204 of the wireless tag unit 300 is successful is notified to the post-processing control portion 400 from the image forming control portion 50.

In addition, each of the ADF 12, the control panel 13, the scanner portion 16, the printer portion 18, and the wireless tag unit 300 is also provided with an arithmetic unit and a recording device.

The post-processing control portion 400 is provided with an arithmetic unit 451 and a storage device 452. The arithmetic unit 451 controls the stapling mechanism 20, the punching mechanism 90, and a transport portion 453 according to various programs stored in the storage device 452. In addition, the transport portion 453 integrates various mechanisms related to a transport system. The transport portion 453, for example, also includes a switching mechanism of a path, such as the paper discharge switching portion 125, a motor which drives a roller, such as the inlet roller 124, and the transport belt 31, a tray which can be operated, such as the standby tray 121, and various sensors.

Next, the control contents of the image forming control portion 50, the wireless tag unit 300, and the post-processing control portion 400 will be described by using a flowchart.

Figure 3:
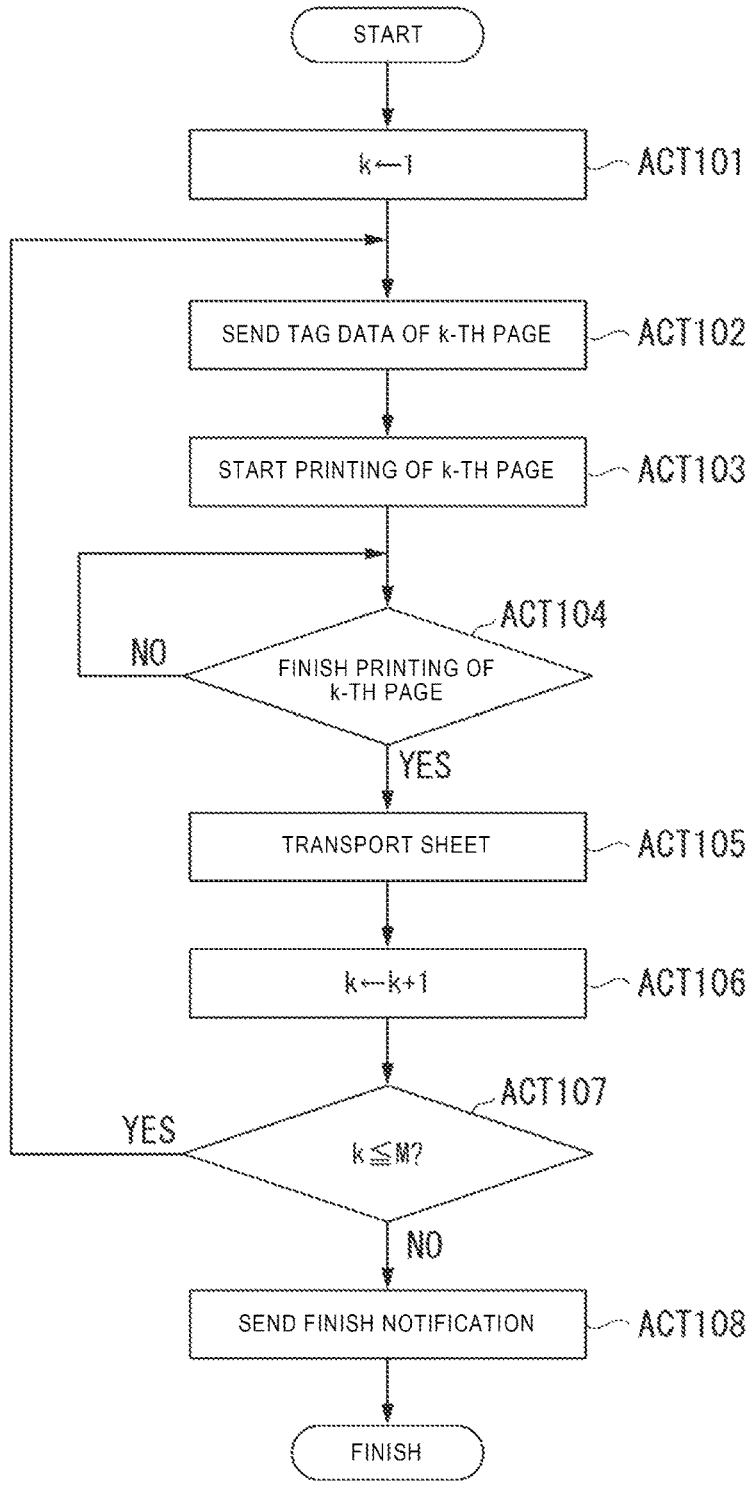
FIG. 3 is a flowchart illustrating a flow of processing of an image forming control portion.
Figure 4:
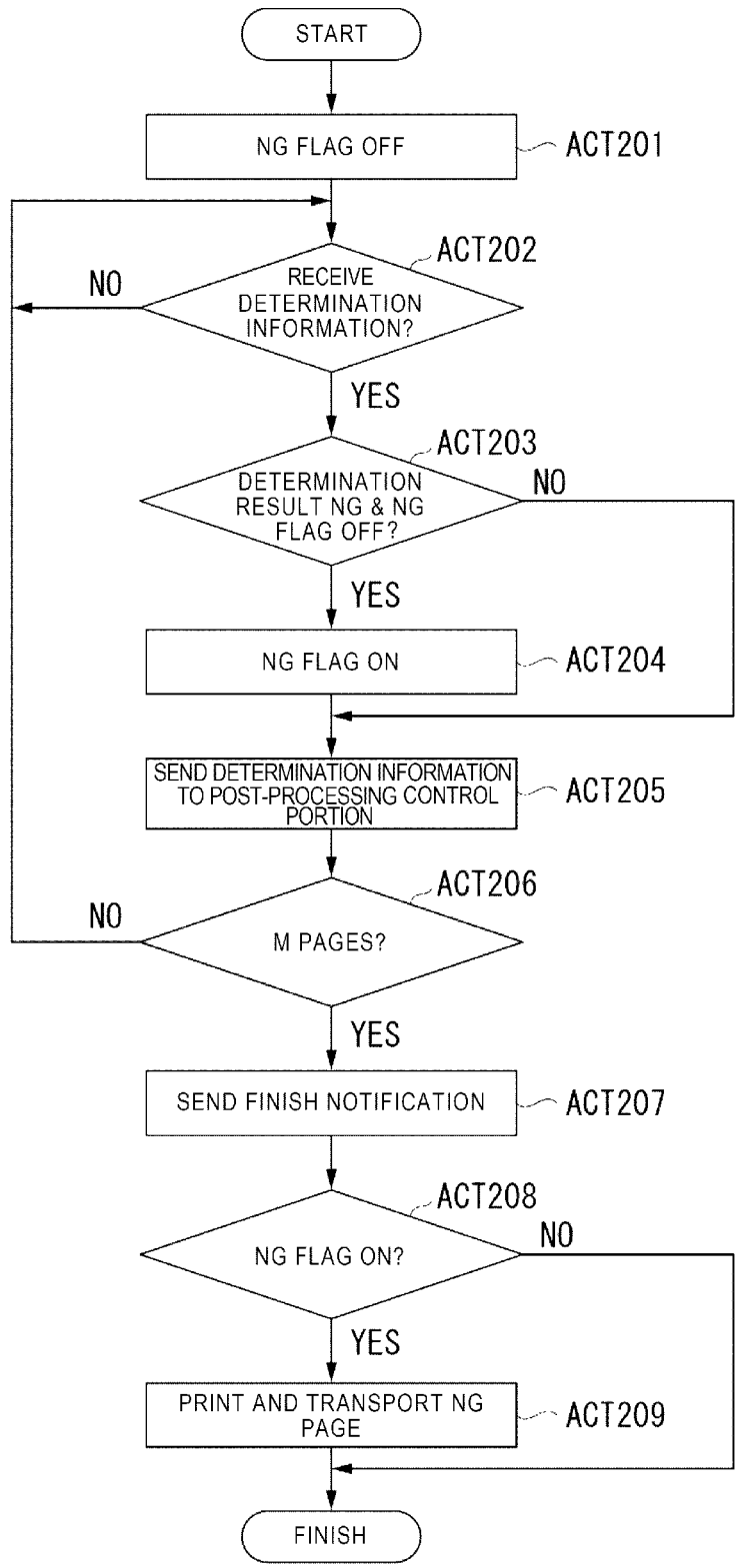
FIG. 4 is a flowchart illustrating a flow of processing of the image forming control portion.

FIGS. 3 and 4 are flowcharts illustrating a flow of processing of the image forming control portion 50. The processing illustrated in FIG. 3 is mainly processing related to the printing, such as processing of printing and sending tag data. In addition, FIG. 3 illustrates processing of printing of M pages to the wireless tag sheet. Tag data written to the wireless tag sheet on which each page printed is stored in the storage device 52.

Meanwhile, the processing illustrated in FIG. 4 is processing related to exchange between the wireless tag unit 300 and the post-processing control portion 400 with respect to the writing of tag data or the like. The processing illustrated in FIG. 3 and the processing illustrated FIG. 4 are executed together.

In FIG. 3, when starting the image forming processing, the image forming control portion 50 initializes a counter k that indicates a page number to be 1 (Act 101). The image forming control portion 50 obtains tag data of the k-th page from the storage device 52, and sends the tag data of the k-th page to the wireless tag unit 300 (Act 102). Here, the sent data contents are (k, tag data) obtained by pairing k which indicates the page and the tag data.

The image forming control portion 50 starts printing of the k-th page (Act 103). When the printing of the k-th page is finished (Act 104: YES), the image forming control portion 50 transports the sheet to the wireless tag unit 300 (Act 105). The image forming control portion 50 increases the counter k by 1 (Act 106).

The image forming control portion 50 determines whether or not the counter k is equal to or less than M (Act 107). In a case where the counter k is equal to or less than M (Act 107: YES), in order to perform the printing of the k-th page, the image forming control portion 50 returns to Act 102. In a case where the counter k is not equal to or less than M (Act 107: NO), the image forming control portion 50 sends a finish notification to the wireless tag unit 300 (Act 108), and the processing is finished. The finish notification is a notification for indicating that the printing of M pages is finished to the wireless tag unit 300.

Next, FIG. 4 will be described. Determination information used in FIG. 4 is information including the above-described determination result. Specifically, the data contents of the determination information is (k, determination result) obtained by pairing k which indicates the page and the determination result. The determination result is expressed as "OK" in a case where the writing is successful and as "NG" in a case where the writing fails.

In FIG. 4, when starting the image forming processing, the image forming control portion 50 initializes an NG flag which indicates whether or not the writing fails to be OFF (Act 201). When receiving the determination information from the wireless tag unit 300 (Act 202: YES), the image forming control portion 50 determines whether the determination result is NG and the NG flag is OFF (Act 203).

In a case where the determination result is OK or the NG flag is ON (Act 203: NO), the image forming control portion 50 moves to Act 205. In a case where the determination result is NG and the NG flag is OFF (Act 203: YES), the image forming control portion 50 sets the NG flag to be ON (Act 204). The image forming control portion 50 sends the determination information sent from the wireless tag unit 300 to the post-processing control portion 400 as it is (Act 205).

The image forming control portion 50 determines whether or not the number of pages indicated in the determination information is M (Act 206). In a case where the number of pages indicated in the determination information is not M (Act 206: NO), the image forming control portion 50 returns to Act 202. In a case where the number of pages indicated in the determination information is M (Act 206: YES), the image forming control portion 50 sends the finish notification to the post-processing control portion 400 (Act 207). The above-described finish notification is a notification for indicating that the sending of all pieces of determination information is finished in the post-processing control portion 400.

The image forming control portion 50 determines whether or not the NG flag is ON (Act 208). In a case where the NG flag is OFF (Act 208: NO), the image forming control portion 50 finishes the processing. In a case where the NG flag is ON (Act 208: YES), the image forming control portion 50 prints an NG page, transports the NG page to the paper discharge portion 205 (Act 209), and finishes the processing. The NG page is a sheet on which an image which indicates that the writing fails in the sheet is formed. The NG page is bound together with the sheets on which the writing fails as a cover of the sheets on which the writing fails. In addition, the sheet on which the NG page is printed is a normal sheet supplied from the paper supply cassette 16b.

Figure 5:
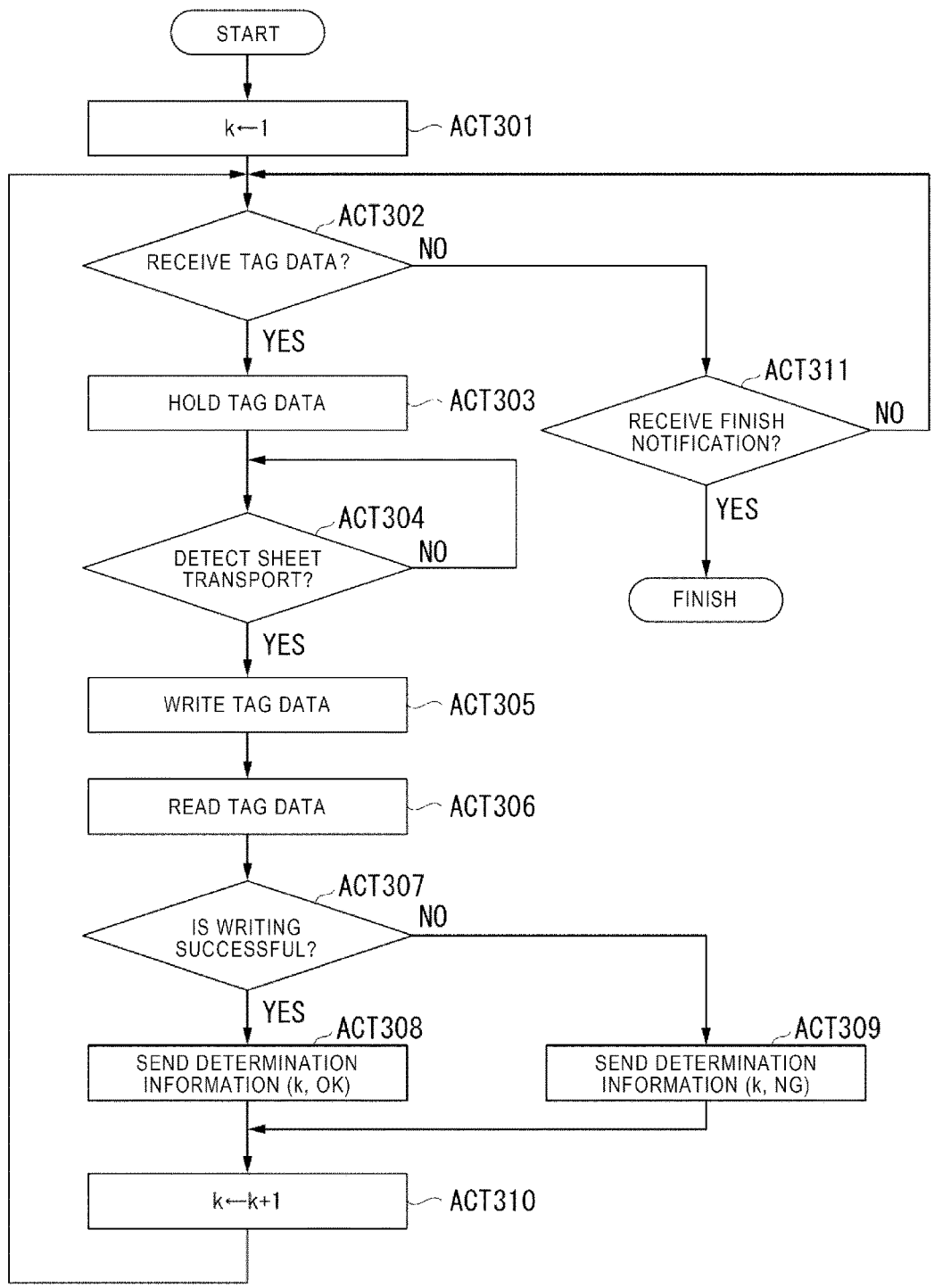
FIG. 5 is a flowchart illustrating a flow of processing of a wireless tag unit.

FIG. 5 is a flowchart illustrating a flow of processing of the wireless tag unit 300.

When the image forming processing is started by the image forming control portion 50, the wireless tag unit 300 initializes the counter k which indicates the page number to be 1 (Act 301). The wireless tag unit 300 determines whether or not the tag data is received from the image forming control portion 50 (Act 302). In a case where the tag data is not received (Act 302: NO), it is determined whether or not the finish notification from the image forming control portion 50 is received (Act 311). In a case where the finish notification from the image forming control portion 50 is received (Act 311: YES), the wireless tag unit 300 finishes the processing. In a case where the finish notification is not received from the image forming control portion 50 (Act 311: NO), the wireless tag unit 300 returns to Act 302.

In Act 302, in a case where the tag data is received (Act 302: YES), the wireless tag unit 300 holds the tag data in the recording device (Act 303). When it is detected that the sheet is transported to the wireless tag unit 300 (Act 304: YES), the wireless tag unit 300 writes the tag data to the wireless tag (Act 305). The wireless tag unit 300 reads the tag data from the wireless tag (Act 306).

The wireless tag unit 300 determines whether or not the writing of the tag data is successful from the read data (Act 307). In a case where the writing is successful (Act 307: YES), the wireless tag unit 300 sends the determination information (k, OK) to the image forming control portion 50 (Act 308). In a case where the writing fails (Act 307: NO), the wireless tag unit 300 sends the determination information (k, NG) to the image forming control portion 50 (Act 309). The wireless tag unit 300 increases the counter k by 1 (Act 310), and returns to Act 302.

Figure 6:
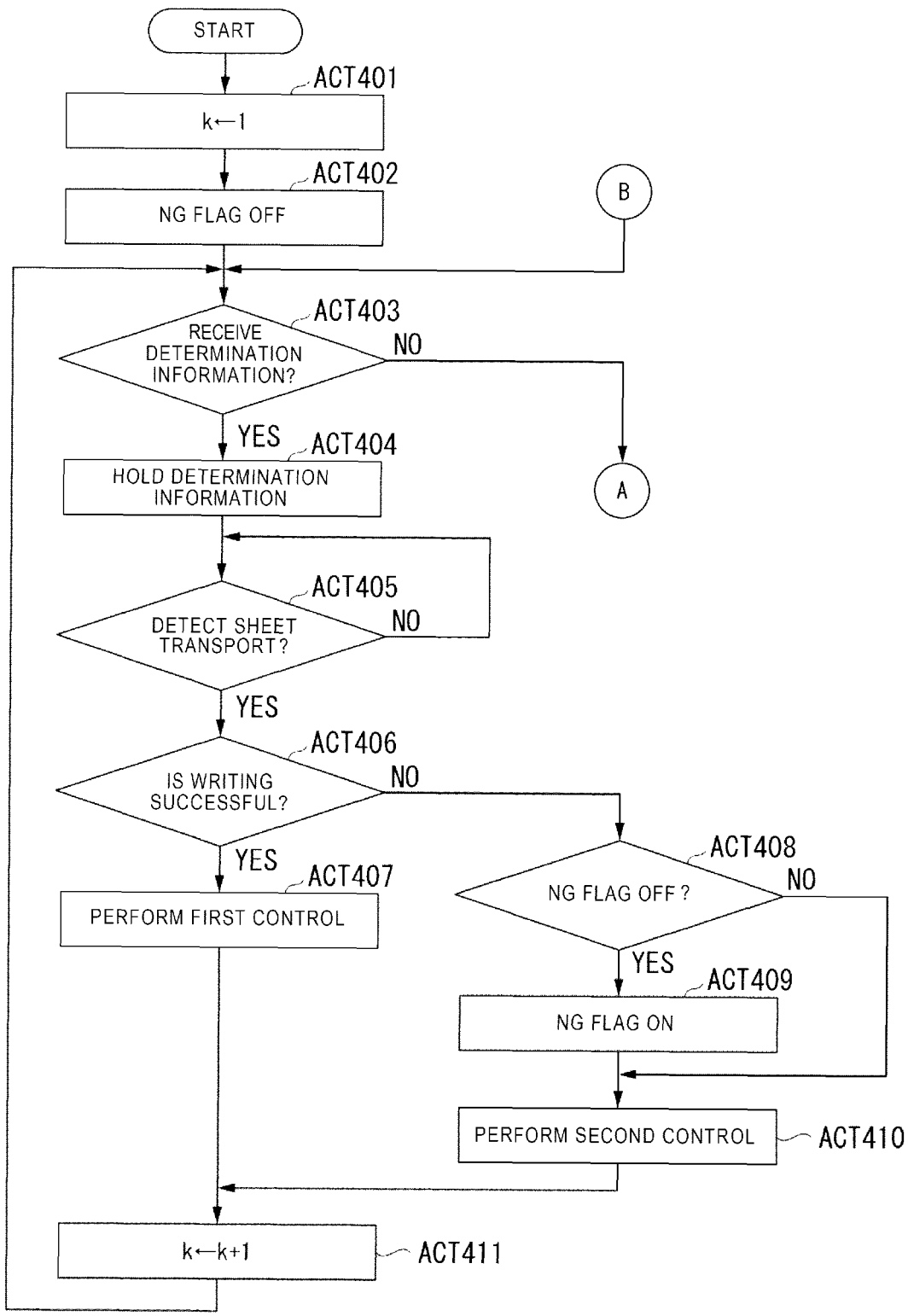
FIG. 6 is a flowchart illustrating a flow of processing of a post-processing control portion.
Figure 7:
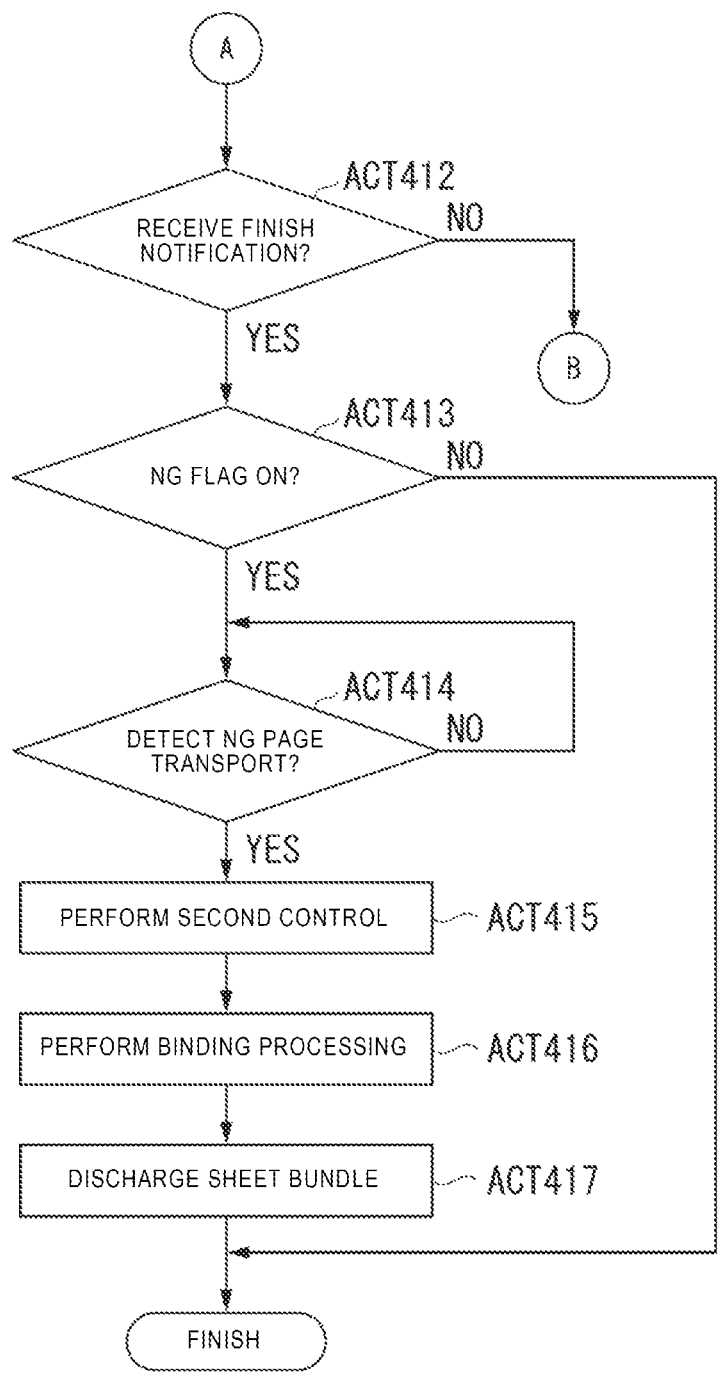
FIG. 7 is a flowchart illustrating a flow of processing of the post-processing control portion.

FIGS. 6 and 7 are flowcharts illustrating a flow of processing of the post-processing control portion 400. FIG. 6 illustrates Acts 401 to 411. FIG. 7 illustrates Acts 412 to 417.

In FIG. 6, when the image forming processing is started by the image forming control portion 50, the post-processing control portion 400 initializes the counter k which indicates the page number to be 1 (Act 401). The post-processing control portion 400 initializes the NG flag which indicates whether or not the writing fails to be OFF (Act 402). The NG flag is a flag having the same properties as those of the NG flag that is described in the processing of the image forming control portion 50, and is stored in the storage device of the post-processing control portion 400.

The post-processing control portion 400 determines whether or not the determination information is received from the image forming control portion 50 (Act 403). In a case where the determination information is received (Act 403: YES), the post-processing control portion 400 holds the received determination information in the storage device (Act 404).

In the receiving portion 130, when detecting that the sheet is transported (Act 405: YES), the post-processing control portion 400 determines whether or not the writing of the tag data to the wireless tag is successful by using the held determination information (Act 406).

In a case where the writing of the tag data to the wireless tag is successful (Act 406: YES), the post-processing control portion 400 performs the following processing. In other words, the post-processing control portion 400 performs the first control with respect to the sheet determined that the writing of the tag data is successful (Act 407).

In a case where the writing of the tag data to the wireless tag fails (Act 406: NO), the post-processing control portion 400 determines whether or not the NG flag is OFF (Act 408). In a case where the NG flag is ON (Act 408: NO), the post-processing control portion 400 moves to Act 410. In a case where the NG flag is OFF (Act 408: YES), the post-processing control portion 400 sets the NG flag to be ON (Act 409).

The post-processing control portion 400 performs the second control with respect to the sheet determined that the writing of the tag data fails (Act 410), and moves to Act 411.

In Act 403, in a case where the determination information is not received (Act 403: NO), the post-processing control portion 400 determines whether or not the finish notification is received from the image forming control portion 50 (Act 412). In a case where the finish notification is not received (Act 412: NO), the post-processing control portion 400 returns to Act 403.

In a case where the finish notification is received (Act 412: YES), the post-processing control portion 400 determines whether or not the NG flag is ON (Act 413). In a case where the NG flag is OFF (Act 413: NO), the post-processing control portion 400 finishes the processing. In a case where the NG flag is ON (Act 413: YES), the post-processing control portion 400 waits for the transport of the NG page.

When the transport of the NG page is detected (Act 414: YES), the post-processing control portion 400 performs the second control with respect to the NG page (Act 415). The post-processing control portion 400 performs the binding processing by the stapling mechanism 20 (Act 416). The post-processing control portion 400 discharges a bound sheet bundle to a movable tray 234 (Act 417), and finishes the processing.

In the above-described Act 406, the success of the writing of the tag data to the wireless tag is determined, but the failure of the writing may also be determined. In this case, in Act 406, it is determined whether or not the writing of the tag data to the wireless tag fails.

Figure 8:
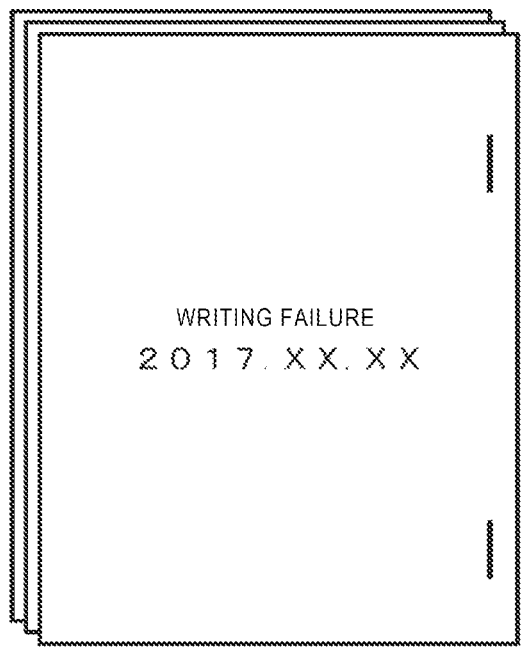
FIG. 8 is a view illustrating an example of a bound sheet bundle.

FIG. 8 is a view illustrating an example of the bound sheet bundle in which the writing of the tag data fails.

In the example of FIG. 8, two pages of sheets on which the writing of the tag data fails and an NG page are illustrated. In the NG page, "writing failure" and "XX. XX. 2017" are printed as an image which indicates that the sheet is a sheet determined that the writing of the tag data fails (hereinafter, also referred to as "failure determination image"). "XX. XX. 2017" is printing date. Furthermore, the three pages of sheets are bound by the stapling.

In this manner, by performing the binding processing, it is possible to visually confirm that the writing fails without the sheets on which the writing of the tag data fails being scattered. Since it is not possible for a human to determine whether or not the writing of the tag data fails even when the wireless tag is visually seen, as described in the embodiment, visualization by the failure determination image is considerably effective.

In addition, the binding processing is not limited to the stapling. Other examples of the binding processing include processing of binding using a tape and processing of binding using an adhesive. Furthermore, the post-processing is not limited to the binding processing. Other examples of the post-processing include processing of punching a punch hole by the punching mechanism 90 and processing of bending the sheet. Since a human can visually confirm the punch hole, the punching is one example of visualizing that the writing of the tag data fails. In addition, the punching of a punch hole has an advantage of being visually confirmed by a human even when the sheets are scattered.

In the example of FIG. 8, as the failure determination image, "writing failure" (or some other written text/image) and the date are printed, but the invention is not limited thereto. For example, as the failure determination image, a page number of a page on which the writing of the tag data fails, the number of sheets on which the writing fails, and/or a non-written text/image, such as symbol, may be included. Accordingly, more specifically, it is possible to provide information related to the sheet on which the writing fails.

In the embodiment, the writing and the reading of the tag data are performed after the printing, but the invention is not limited thereto. When it is possible to correctly determine whether or not the writing of the tag data is successful, timing of writing the tag data or timing of reading the tag data does not matter. For example, the writing of the tag data may be performed before the printing, or the reading of the tag data may be performed after the printing.

Furthermore, the writing of the tag data may be performed by the image forming apparatus 100, and the reading of the tag data may be performed by the post-processing apparatus 200. Otherwise, the writing and the reading of the tag data may be performed by the post-processing apparatus 200.

In the embodiment, the post-processing is performed with respect to the sheet on which the writing fails, but the post-processing may be performed with respect to the sheet on which the writing is successful.

According to the above-described embodiment, the sheet determined that the writing of the information is successful is discharged to the fixing tray 62, and the sheet determined that the writing of the information fails is discharged to the paper discharge tray 61. In this manner, it is possible to provide a post-processing apparatus in which the sheet on which the writing of information is successful and the sheet on which the writing fails do not exist together, and an image forming system.

While certain embodiments have been described these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A post-processing apparatus comprising:
a memory that stores instructions;
a processor that executes the instructions stored in the memory;
a receiving portion configured to receive a sheet output by an image forming apparatus that writes information to a wireless tag provided on the sheet;
a determination portion configured to determine success or failure of writing of information to the wireless tag provided on the sheet received by the receiving portion; and
a paper discharge controller configured to discharge a sheet determined that writing of the information is successful by the determination portion to a first paper discharge portion, and to discharge a sheet determined that writing of the information fails by the determination portion to a second paper discharge portion different from the first paper discharge portion,
wherein a sheet on which an image is formed indicating that one or more discharged sheets are sheets determined that writing of the information fails is discharged to the second paper discharge portion in a case where the one or more sheets are discharged to the second paper discharge portion by the paper discharge controller, after finishing the determination by the determination portion for a plurality of sheets received by the receiving portion.

2. The apparatus according to claim 1, further comprising:
a post-processing device configured to perform post-processing on a sheet discharged to the second paper discharge portion by the paper discharge controller.

3. The apparatus according to claim 2,
wherein the post-processing device is a binder configured for binding sheets discharged to the second paper discharge portion.

4. The apparatus according to claim 2,
wherein the post-processing device is a punch configured for punching at least one hole into sheets discharged to the second paper discharge portion.

5. The apparatus according to claim 1, further comprising:
a post-processing device configured to perform post-processing on a sheet discharged to the first paper discharge portion by the paper discharge controller.

6. The apparatus according to claim 1,
wherein the determination portion comprises a wireless tag unit configured to read tag data from the wireless tag in order to determines whether or not the writing of the information is successful from the read data.

7. The apparatus according to claim 1,
wherein the image comprises written text indicating that the discharged sheet is determined that writing of the information fails.

8. A control method for a post-processing apparatus, comprising:
receiving a sheet output by an image forming apparatus that writes information to a wireless tag provided on the sheet;
determining success or failure of writing of information to the wireless tag provided on the sheet received from the image forming apparatus;
discharging a sheet determined that writing of the information is successful by the determining to a first paper discharge portion, and discharging a sheet determined that writing of the information fails by the determining to a second paper discharge portion different from the first paper discharge portion;
forming on a sheet an image indicating that one or more discharged sheets are sheets determined that writing of the information fails; and
discharging the sheet with the image to the second paper discharge portion in a case where the one or more sheets are discharged to the second paper discharge portion, after finishing the success or failure of writing of information for a plurality of sheets.

9. The method according to claim 8, further comprising:
performing post-processing on a sheet discharged to the second paper discharge portion.

10. The method according to claim 9,
wherein the post-processing is binding of sheets discharged to the second paper discharge portion.

11. The method according to claim 8,
wherein determining comprises reading tag data from the wireless tag in order to determines whether or not the writing of the information is successful from the data read.

12. An image forming system comprising:
an image forming apparatus; and
a post-processing apparatus,
the image forming apparatus comprising:
   a first memory that stores instructions;
   a first processor that executes the instructions stored in the first memory; and
   a portion configured to write information to a wireless tag provided on a sheet,
the post-processing apparatus comprising:
   a second memory that stores instructions;
   a second processor that executes the instructions stored in the second memory;
   a receiving portion configured to receive a sheet output by the image forming apparatus,
   a determination portion configured to determine success or failure of writing of information to the wireless tag provided on the sheet received by the receiving portion, and
   a paper discharge controller configured to discharge a sheet determined that writing of the information is successful by the determination portion to a first paper discharge portion, and to discharge a sheet determined that writing of the information fails by the determination portion to a second paper discharge portion different from the first paper discharge portion,
wherein a sheet on which an image is formed indicating that one or more discharged sheets are sheets determined that writing of the information fails is discharged to the second paper discharge portion in a case where the one or more sheets are discharged to the second paper discharge portion by the paper discharge controller, after finishing the determination by the determination portion for a plurality of sheets received by the receiving portion.

13. The system according to claim 12, further comprising:
a post-processing device configured to perform post-processing on a sheet discharged to the second paper discharge portion by the paper discharge controller.

14. The system according to claim 13,
wherein the post-processing device is a binder configured for binding sheets discharged to the second paper discharge portion.

15. The system according to claim 13,
wherein the post-processing device is a punch configured for punching at least one hole into sheets discharged to the second paper discharge portion.

16. The system according to claim 12,
wherein the determination portion comprises a wireless tag unit configured to read tag data from the wireless tag in order to determines whether or not the writing of the information is successful from the read data.

17. The system according to claim 12,
wherein the image comprises written text indicating that the discharged sheet is determined that writing of the information fails.

* * * * *